United States Patent [19]

Touze

[11] Patent Number: 4,883,407
[45] Date of Patent: Nov. 28, 1989

[54] SCREWED ATTACHMENT OF A BODY OF REVOLUTION TO AN ANNULAR FLANGE IN A TURBINE ENGINE

[75] Inventor: Eric Touze, Le Mee Sur Seine, France

[73] Assignee: Societe Nationale d'Etude et de Construction de Moteurs d'Aviation "SNECMA", Paris, France

[21] Appl. No.: 285,583

[22] Filed: Dec. 16, 1988

[30] Foreign Application Priority Data

Dec. 16, 1987 [FR] France .................................. 87 17547

[51] Int. Cl.⁴ .............................................. F04D 29/60
[52] U.S. Cl. ..................................... 415/190; 415/142; 411/108; 411/194; 411/203
[58] Field of Search .................. 415/189, 190, 142; 411/108, 109, 193, 194, 198, 202, 203, 970, 979

[56] References Cited

U.S. PATENT DOCUMENTS

| | | | |
|---|---|---|---|
| 1,328,488 | 1/1920 | Bowden | 411/970 |
| 2,930,662 | 3/1960 | Henstridge | 415/142 |
| 2,984,454 | 5/1961 | Fiori | 415/190 |
| 3,135,309 | 6/1964 | Soltysik | 411/970 |
| 3,737,660 | 4/1973 | Burge | 411/337 |
| 4,190,397 | 2/1980 | Schilling et al. | 415/112 |
| 4,493,597 | 1/1985 | Rolf | 411/193 |

FOREIGN PATENT DOCUMENTS

| | | | |
|---|---|---|---|
| 483555 | 7/1917 | France . | |
| 2057617 | 4/1981 | United Kingdom . | |
| 2071776 | 9/1981 | United Kingdom | 415/189 |

Primary Examiner—Robert E. Garrett
Assistant Examiner—John T. Kwon
Attorney, Agent, or Firm—Oblon, Spivak, McClelland, Maier & Neustadt

[57] ABSTRACT

An annular fairing forming a bolt guard associated with the heads of screws of an attachment carries, inside thereof and in line with each screw, first cylindrical sockets each of which comprises notch-shaped cut-outs at its inner end which cooperate with a pair of first lugs formed at the end of a respective second socket disposed within the first socket and further comprising a pair of inwardly curved second lugs cooperating with the head of the screw in such a way as to prervent rotation of the screw.

9 Claims, 2 Drawing Sheets

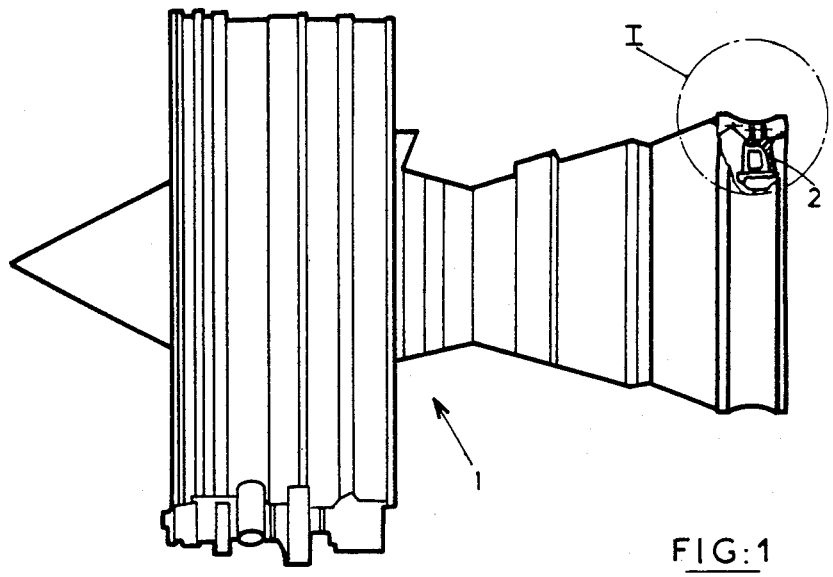
FIG:1
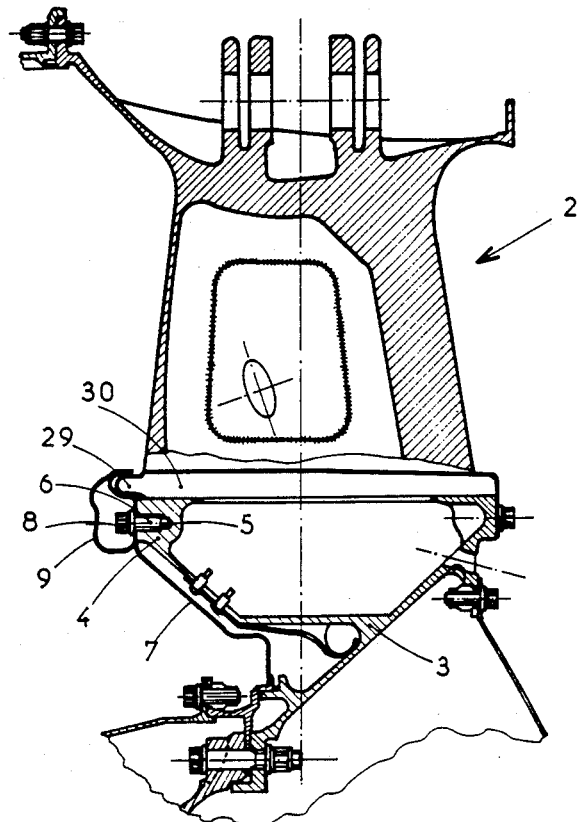
FIG:2

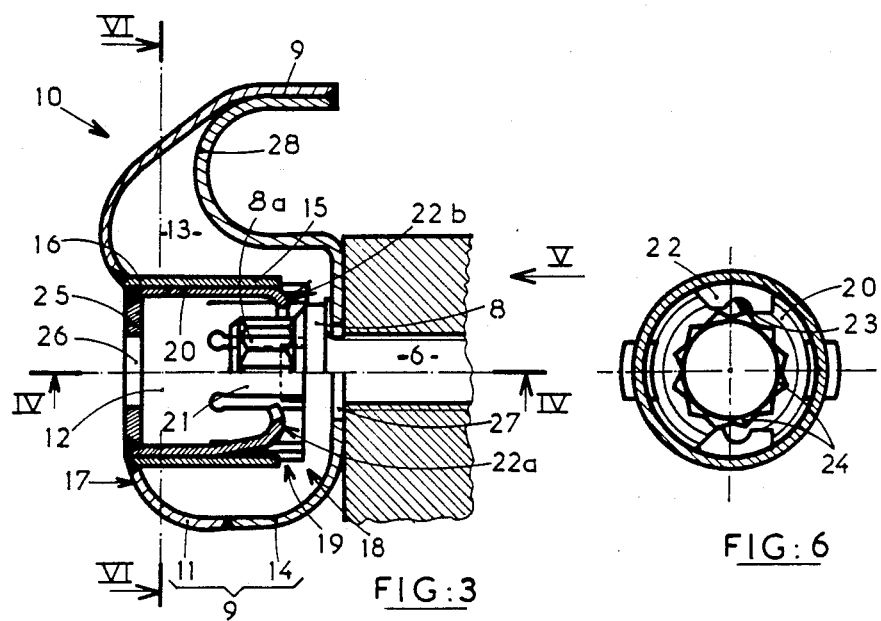
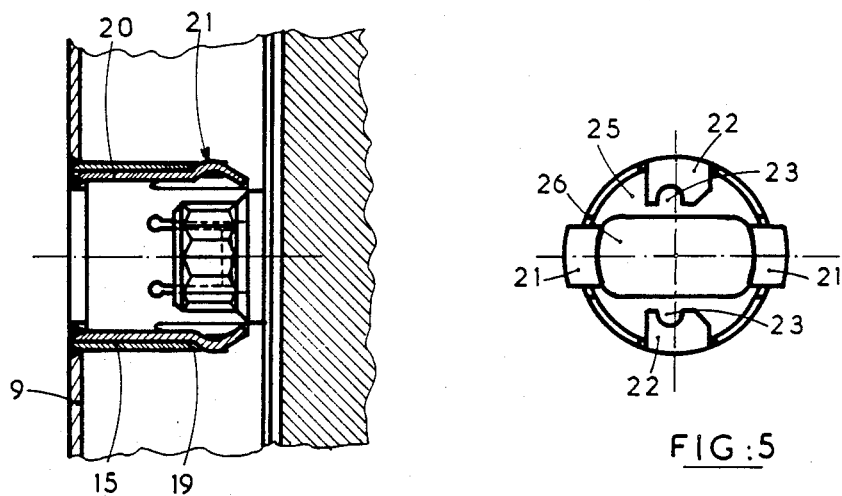

SCREWED ATTACHMENT OF A BODY OF REVOLUTION TO AN ANNULAR FLANGE IN A TURBINE ENGINE

BACKGROUND OF THE INVENTION

1. Field of the Invention

The present invention relates to a screwed attachment to an annular flange in a turbine engine in which the heads of the screws are covered by an annular fairing or bolt guard.

When screws are used for fixing an element on an annular flange, particularly in turbine engine applications, it is necessary, when the heads of the screws are located in a streamline flow of air or gas, to cover them with an annular fairing or bolt guard in order to avoid harmful disturbances in the flow.

2. Summary of the Prior Art

U.S. Pat. No. 3 727 660 describes an example of an application to a compressor in which a bolt guard is used and is furthermore arranged in such a way as to ensure retention of the elements in the event of accidental unscrewing or loss of an element for any reason in order thus to avoid such an element becoming entrained by the flow of gases and thereby causing any damage, which could be considerable. Despite its advantages, however, the solution proposed necessitates total caging of all the bolts which in some applications may present drawbacks with regard to the fitting and dismantling operations, particularly maintenance operations in which it is necessary to deal with only a single bolt, for example.

SUMMARY OF THE INVENTION

The aim of the invention is to provide a more satisfactory way of forming a screwed attachment including a bolt guard, which does not suffer from the drawbacks of the known solutions.

To this end, according to the invention, there is provided attachment means for fixing a body of revolution to an annular flange in a turbine engine, comprising a plurality of evenly distributed screws, each of said screws having a head, an annular fairing forming a bolt guard over the heads of said screws, said bolt guard having means defining access holes to said screws in the face of said bolt guard opposite said screws, a plurality of first tubular sockets within said bolt guard and respectively aligned with said screws, said first sockets being wider than the heads of said screws and having first and second ends, said first ends being rigidly fixed to said bolt guard in the region of said access holes, and said second end of each of said first sockets having at least one notch-like cut-out, and a plurality of second tubular sockets respectively disposed within said first sockets, each of said second sockets having its inner end formed with at least one lug cooperating with said cut-out of the respective first socket, and at least one second lug curved inwardly and cooperating with the head of the respective screw in such a way as to prevent rotation of said screw.

Preferably, the or each of the second lugs of each of said second sockets is cut from the side wall of said second socket and is deformed slightly inwardly with respect to said side wall, the inner edge of said second lug being folded inwardly at right angles and having a slightly off-centre semi-circular cut-out.

Furthermore, each of the second sockets preferably comprises a cover at its outer end, said cover including means defining an oblong hole to facilitate withdraw of said second socket by means of a suitable tool.

Further characteristics and advantages of the invention will become apparent from the following description of a preferred embodiment of the invention with reference to the attached drawings.

BRIEF DESCRIPTION OF THE DRAWINGS

FIG. 1 shows a diagrammatic general view of a turbine engine in which a screwed attachment asssociated with a bolt guard in accordance with the invention is used and is shown by a cut-away portion, seen as a longitudinal section in a plane passing through the axis of rotation of the turbine engine;

FIG. 2 shows an enlarged view of the cut-away portion I in FIG. 1, seen as a longitudinal section in a plane passing through the axis of rotation of the turbine engine;

FIG. 3 is an enlarged view of a detail from FIG. 2 illustrating the attachment shown in FIGS. 1 and 2;

FIG. 4 shows a section on the line IV—IV in FIG. 3;

FIG. 5 is an end view, looking in the direction of the arrow V, of a part of the attachment shown in FIG. 3; and FIG. 6 shows a section on the line VI—VI in FIG. 3.

DESCRIPTION OF THE PREFERRED EMBODIMENT

The turbine engine 1 shown diagrammatically in FIG. 1 comprises, at the turbine output, an exhaust casing 2 on the downstream side of which is mounted a jet pipe (not shown in the drawings). As shown in greater detail in FIG. 2, the exhaust casing 2 comprises a hub 3 carrying on its upstream side an annular flange 4 provided with evenly distributed screw-threaded fixing holes 5. These holes 5 receive screws 6 which, in the embodiment shown in the drawings, are intended for fixing a ventilation cover 7 on the said flange 4. The heads 8 of the screws 6 are covered by an annular fairing which is made from sheet metal and is shaped to ensure good aerodynamic conditions for the flow of gases, the fairing constituting a bolt guard 9.

The attachment means 10 in accordance with the invention and comprising the bolt guard 9 and screws 6 is shown in greater detail in FIGS. 3 to 6. In line with each screw 6 the bolt guard has an access hole 12 in the outer face of the fairing. In the annular space 13 within the bolt guard 9, situated between its outer face 11 and its inner face 14 and in which the heads 8 of the screws 6 are accommodated, there are first cylindrical sockets 15 each having a first end 16 rigidly fixed to the said outer face 11. In the embodiment shown, the end 16 of each socket 15 is welded to the circular edge 17 of a respective access hole 12. The two parts 11 and 14 of the bolt guard 9 may also be welded to each other in order to facilitate manufacture. The other end 18 of each of the first sockets 15 is provided with four notched-shaped cut-outs 19.

Fitting within each of the first sockets 15 there is a second cylindrical socket 20, the inner end of which is cut to form two diametrically opposite first lugs 21 which, as can be seen in FIGS. 4 and 5, are slightly deformed outwardly in such a way that they can fit into the said cut-outs 19 on the first socket 15, and two second lugs 22 positioned in between the first lugs 21. One of the second lugs 22a is shown in the lower half of the view shown in FIG. 3 in the free position which is adopted by the lugs 22 when the socket 20 is not in use, and in which the inner edge of the lug is folded inwardly at a right angle and the lug itself is bent slightly inwardly. The other second lug 22b is shown in the upper half of FIG. 3 in the operative position of the lugs 22, in which the inner edge is engaged with the portion 8a of the head 8 of the corresponding screw 6. As can be seen from FIGS. 5 and 6, the inner edge of each second lug 22 comprises a semi-circular cut-out 23 which is slightly off-centre. The portion 8a of the head of each screw 6 is serrated to form external teeth 24, and one of these teeth is engaged in the cut-out 23 of one of the second lugs 22. The outer end of the second socket 20 has a cover 25 in which there is an oblong hole 26.

The method of mounting the assembly which has just been described is as follows. The bolt guard 9 with the internal sockets 15 is positioned over the members which are to be assembled, ie. the ventilation cover 7 and the annular flange 4 of the exhaust casing 2, and the screws 6 are inserted and tightened in the screw-threaded holes 5 of the said flange, passing through the access holes 12 and through fixing holes 27 provided in the inner part 14 of the bolt guard 9 so that the heads 8 of the screws 6 bear on the edges of these holes 27. The second sockets 20 are then inserted into the first sockets 15 in the bolt guard 9 via the access holes 12 in such a way that the first lugs 21 can click into cut-outs 19 of the first sockets 15, and the inner edge of the second lugs 22 engage over the teeth 24 on the head portions 8a of the screws 6. In the embodiment shown in the drawings, there are twelve teeth 24 on each screw, and the cut-outs 23 of the lugs 22 which cooperate with them are offset by a twenty-fourth of a turn in such a way as to ensure secure engagement of a tooth 24 in one of the cut-outs 23.

As a consequence of the arrangement described, each screw 6 is rotationally locked by the engagement of the teeth 24 on the screw head 8 with the second lugs 22 of the second socket 20, which is itself locked by the first lugs 21 in engagement with the first socket 15 which is rigid with the fixed assembly. Any accidental slackening is thus avoided. In the extreme case where a breakage or damage to the lugs 21 would make it possible for a screw 6 to become unscrewed, the second socket 20 remains attached to the head of the screw 6 by means of the lugs 22.

The assembly obtained retains the facility for dismantling and it is possible to perform an operation on the screws 6 individually. Indeed, it is sufficient to engage a suitable tool by a quarter of a turn in the oblong hole 26 in the cover 25 of the second socket 20, and then to pull on the socket in order to disengage not only the first lugs 21 from the cut-outs 19 of the first socket 15 but also the second lugs 22 from the teeth 24 of the screw head 8. The risks of premature wear and tear after several fitting and dismantling operations are reduced by reason of the fact that only a resilient deformation of the lugs of the second socket 20 occurs in order to ensure locking of the whole attachment assembly.

In the embodiment described and shown in the drawings, the bolt guard 9 also comprises, on the downstream side, an annular groove 28 which receives the upstream edges 29 of heat protecting tiles 30 on the hub 3 of the exhaust casing 2 of the turbine engine.

What is claimed is:

1. Attachment means for fixing a body of revolution to an annular flange in a turbine engine, comprising a plurality of evenly distributed screws, each of said screws having a head, an annular fairing forming a bolt guard over the heads of said screws, said bolt guard having means defining access holes to said screws in the face of said bolt guard opposite said screws, a plurality of first tubular sockets within said bolt guard and respectively aligned with said screws, said first sockets being wider than the heads of said screws and having first and second ends, said first ends being rigidly fixed to said bolt guard in the region of said access holes, and said second end of each of said first sockets having at least one notch-like cut-out, and a plurality of second tubular sockets respectively disposed within said first sockets, each of said second sockets having its inner end formed with at least one lug cooperating with said cut-out of the respective first socket, and at least one second lug curved inwardly and cooperating with the head of the respective screw in such a way as to prevent rotation of said screw.

2. Attachment means according to claim 1, wherein said bolt guard is formed by two welded parts, and said first tubular sockets are welded at said first ends thereto the edges of said access hole in the outer part of said bolt guard.

3. Attachment means according to claim 1, wherein said first and second sockets are cylindrical.

4. Attachment means according to claim 1, wherein each of said second sockets has two of said first lugs and two of said second lugs.

5. Attachment means according to claim 1, wherein each of said first sockets has four of said notch-like cut-outs at said second end thereof.

6. Attachment means according to claim 1, wherein said head of each of said screws has a portion provided with a plurality of teeth disposed around the periphery thereof, and said at least one second lug of each of said second sockets cooperates with said teeth on the head of the respective screw.

7. Attachment means according to claim 1, wherein said at least one second lug of each of said second sockets is cut from the side wall of said second socket and is deformed slightly inwardly with respect to said side wall, the inner edge of said second lug being folded inwardly at right angles and having a slightly off-centre semi-circular cut-out.

8. Attachment means according to claim 1, wherein each of said second sockets is provided with a cover at its outer end, said cover including means defining an oblong hole to facilitate withdrawal of said second socket.

9. Attachment means according to claim 1, wherein said body of revolution is constituted by a ventilation cover and said annular flange is located on the upstream side of a hub of an exhaust casing of said turbine engine, said hub having heat protective tiles, and said bolt guard including on its downstream side an annular groove accommodating the upstream edge of said tiles.

* * * * *

UNITED STATES PATENT AND TRADEMARK OFFICE
CERTIFICATE OF CORRECTION

PATENT NO. : 4,883,407

DATED : November 28, 1989

INVENTOR(S) : ERIC TOUZE

It is certified that error appears in the above-identified patent and that said Letters Patent is hereby corrected as shown below:

In the abstract, line 9, delete "prervent" and insert --prevent--.

Signed and Sealed this

Twenty-ninth Day of January, 1991

Attest:

HARRY F. MANBECK, JR.

*Attesting Officer*   *Commissioner of Patents and Trademarks*